Patented Mar. 19, 1940

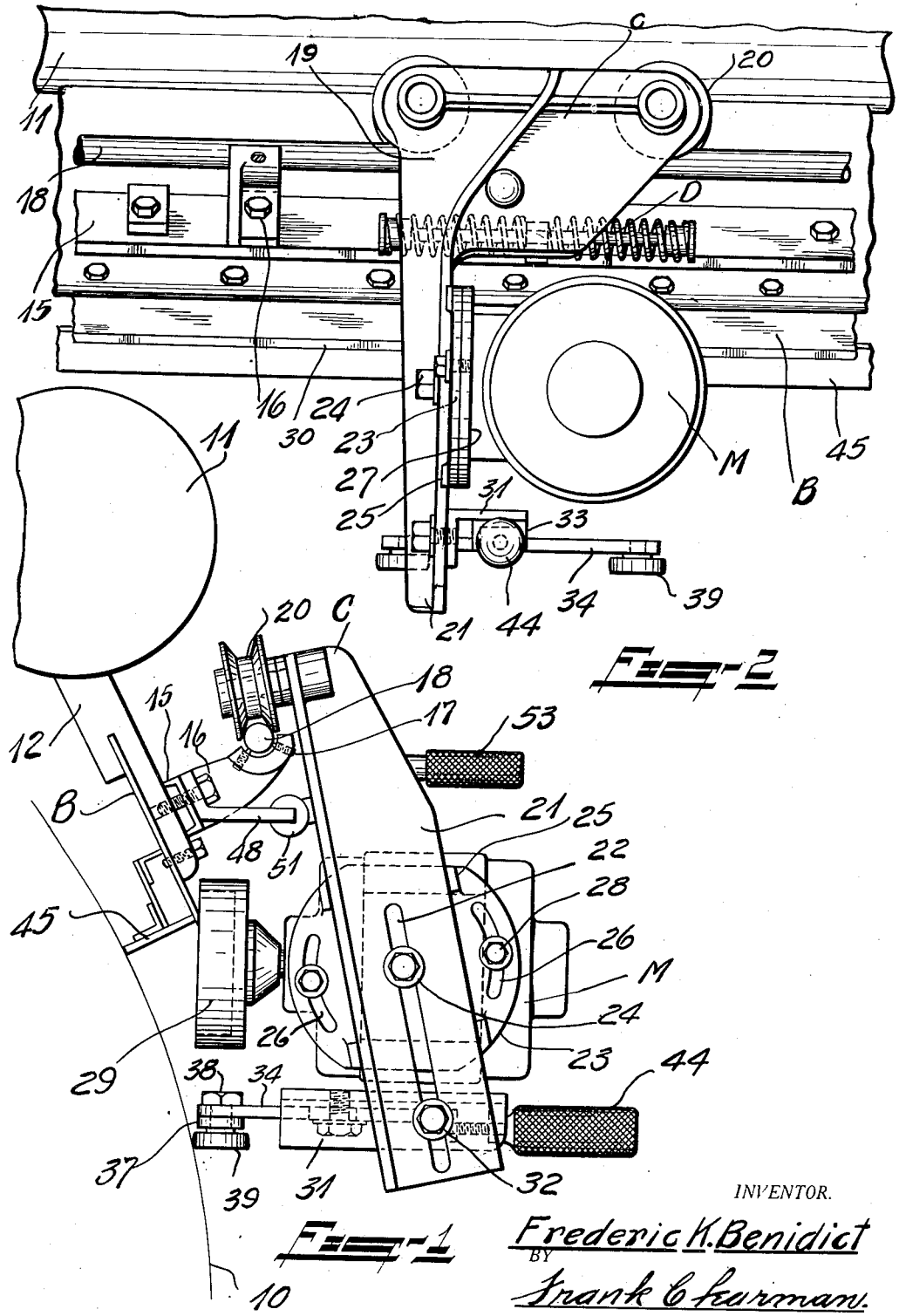

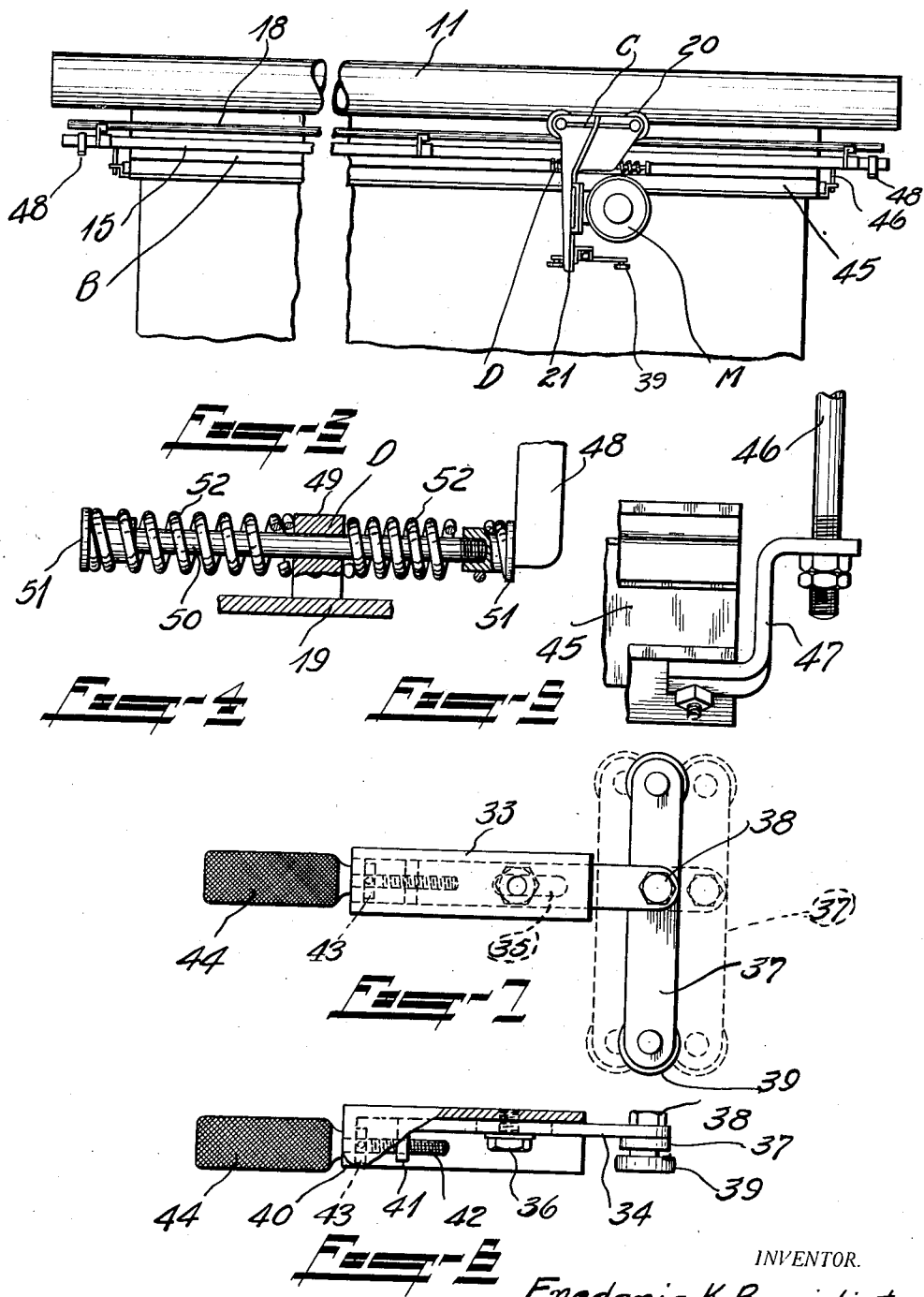

2,193,854

UNITED STATES PATENT OFFICE 2,193,854

PORTABLE BLADE GRINDER

Frederic K. Benedict, Big Rapids, Mich.

Application June 10, 1938, Serial No. 212,859

11 Claims. (Cl. 51—173)

This invention relates to blade grinders, and more particularly to a portable blade grinder which is motor driven, and which can be easily and quickly mounted and/or demounted, so that the blade may be accurately ground without removing it from its mounting.

One of the prime objects of the invention is to provide a motor driven blade grinding member suspended on a traveling carriage associated with a drying drum, and provide means engageable with the face of the drum for guiding contact therewith to insure a grind parallel with said drum.

Another object of the invention is to provide a carriage including a grinding element mounted on a track, and provide simple and quickly adjustable means for adjusting the angle of the motor and grinding element with relation to the blade to be ground.

A further object is to provide a blade grinding means mounted on a carriage and provide stops for limiting the longitudinal travel of said carriage, together with cushioning means for reversing the direction of travel when the carriage engages said stops.

A still further object is to design a blade grinding unit which can be very easily operated and adjusted, which requires no skilled operator, and which is of sturdy and substantial construction, eliminating any vibration and insuring uniform and accurate grinding.

A further object still is to provide detachable means for accurately holding and spacing the blade from the face of the drum during the grinding operation.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction without departing from the spirit, or sacrificing any of the advantages of the invention.

In the drawings:

Fig. 1 is a side elevational view of my blade grinding unit showing also a section of a dryer drum.

Fig. 2 is a fragmentary front elevational view of the mechanism shown in Fig. 1.

Fig. 3 is a front assembly view similar to Fig. 2.

Fig. 4 is a plan view illustrating the stop and recoil springs.

Fig. 5 is a fragmentary view of the straight edge and its supporting means.

Fig. 6 is an enlarged detail part sectional edge view of the wheeled guide assembly.

Fig. 7 is a top plan view thereof, the broken lines showing it in various positions of adjustment.

For the purpose of illustration I have shown my blade grinding unit in connection with a dry milk machine, such as used in creameries and plants of a like nature. With such machines, it is general practice to spray milk, buttermilk, etc. onto the outer periphery of a driven, heated drum, thus drying the product on the surface of the drum and from which it must be scraped as the drum is rotated, and while in the present instance I have shown my invention as applied to a dry milk machine, it will be understood that it may be used in sharpening blades of various lengths in machines of various kinds.

A channel member 15 is secured to the face of the holder 12 as shown, and brackets 16 are secured to said channel in spaced apart relation, the free end of each bracket being semi-circular in shape and includes angularly disposed adjusting screws 17 on which the ground and polished track 18 is mounted, said screws being adjustable for properly aligning the track.

A traveling carriage C is adapted to ride on this track 18, and includes a frame 19 having spaced apart anti-friction wheels 20 secured to the upper end thereof and which travel on the track 18. A depending leg or bracket 21 is formed integral with the frame 19, and is preferably angular in cross section, said leg being slotted as at 22, and a swivel plate 23 is secured to the inner face of this leg by means of the bolt 24 which extends through the slotted opening 22. Lugs 25 are cast integral with the plate 23 as shown, and diametrically opposed, slotted openings 26 are provided in the plate adjacent the edges thereof, and for a purpose to be presently described.

A motor plate 27 is disposed in facial contact with the swivel plate 23 and to which the motor M is secured, bolts 28 extending through the slotted openings 26, and being anchored in the motor plate 27, so that by loosening the bolts 26, the motor and motor plate can be rotated on the plate 23 and angularly adjusted as described. Vertical adjustment is accomplished by loosening the bolt 24 to slide the swivel plate 23 and motor vertically as desired, the lugs 25 holding the motor in proper position when making the adjustment.

The blade grinding unit is mounted on the leg 21 of the traveling carriage, and includes the motor M, together with a cup shaped grinding element 29 which is mounted on the motor shaft, said element engaging the beveled edge 30 of the blade, and it will be obvious that the grinding unit can be easily and quickly adjusted, either vertically or angularly, with relation to the blade as above described.

To insure that the grind will always be parallel with the drum I provide an angle 31 which I secure to the bracket leg by means of a bolt 32, a channel shaped housing 33 being secured to said angle, and a bar 34 is adjustably mounted therein, said bar being slotted as at 35 and a bolt 36 serves to secure the bar in position.

A transversely disposed strip 37 is secured to the outer end of the bar 34 by means of the bolt 38, and anti-friction wheels 39 are provided on the ends of the strip 37 and are adapted to ride on the face of the drum for guiding contact therewith. Depending legs 40 and 41 are provided on the ends of the housing, and bars 33 and 34 respectively, and an adjusting member 42 extends through the leg 40, a collar 43 being pinned on said member, the end being threaded into the threaded opening provided in the leg 41, so that by manipulation of the said handle 44, the guide wheel assembly may be adjusted as desired to properly space the cutting element with relation to the cutting edge of the blade.

A straight edge 45 is provided for holding the blade away from the drum when the blade is being ground, and this straight edge is supported from the channel 15, being interposed between the drum and the blade, a hanger rod 46 being provided at each end and as shown in Fig. 5 of the drawings, and a clip 47 serves to connect the hanger rods to the straight edge.

Stops 48 are provided on the ends of the channel 15 to limit the travel of the unit, and a reversing mechanism D is provided on the carriage for cushioning the shock and reversing the direction of travel when the carriage reaches the end of the track, said mechanism including a lug 49 welded or otherwise secured to the bracket leg 21, a rod 50 being slidably mounted in said lug, and caps 51 are threaded on the ends of the rod, opposed recoil springs 52 being interposed between the caps and the lug, so that when one of the caps engage a stop, the rod will slide in the lug 49, one of the springs 52 will be compressed, and the recoil will then reverse the direction of travel of the carriage.

The device can be easily and quickly mounted; it is merely necessary to mount the straight edge 45, place the wheeled carriage C on the track 18, connect the motor to a suitable source of electric supply, such as a light socket, the unit is then adjusted by means of the adjusting screws to swing the grinding element tangent to the blade for grinding at the proper bevel, the motor is then energized to start the grinding stroke, the operator grasps the handle 53 and pushes the carriage along on the track, the carriage rolls easily and smoothly, requiring merely finger touch control, and when one of the members 51 engages a stop 48, the carriage is automatically started back on the return stroke.

There is no necessity for removal of the blade to take it to a shop to be ground with consequent delay and loss of working time, the blade is sharpened as frequently as necessary, and the grind is always parallel with the face of the dryer drum, thus insuring true and accurate grinding.

From the foregoing description, it will be obvious that I have perfected a very simple, practical, and efficient portable grinding machine for sharpening blades.

What I claim is:

1. A portable dryer drum blade grinding device comprising a pivotally mounted support, a track mounted thereon, a wheeled carriage mounted to travel on said track, a driven grinding element mounted on said carriage and in grinding contact with the dryer drum blade to be ground, means for securing said blade in predetermined position with relation to the drum, and adjustable means engageable with the drum for maintaining the relative parallel relation of the grinding edge of the grinding element and the blade as the carriage is moved on the track.

2. A device as claimed in claim 1 in which the driven grinding element is pivotally and vertically adjustable on said carriage.

3. A device as claimed in claim 1 in which stops are provided at the ends of the track, and resiliently mounted stop engaging means on the carriage for cushioning and reversing the direction of travel thereof.

4. A blade grinding device comprising in combination a pivotally mounted support, an adjustable track mounted on said support, a wheeled carriage mounted on said track, a driven grinding element pivotally and vertically adjustable on said carriage and in grinding relation with the blade to be ground, stops on said track, and resiliently mounted bumpers on said carriage for reversing the direction of travel of said carriage when the bumper engages a stop.

5. A device for grinding the blade on a dryer drum comprising a track, a carriage mounted to travel on the track, a grinding element adjustably mounted on the carriage and engaging the blade to be ground, means for accurately spacing said blade from the face of the dryer drum, and adjustable anti-friction means mounted on said carriage and in guiding contact with the drum as the carriage travels on the track.

6. A device for grinding the blade on dryer drums comprising a track, a quickly removable carriage mounted to travel on said track, a driven grinding unit mounted on the carriage and adjustable with relation thereto and to the blade, means for spacing the blade from the drum, and wheeled anti-friction means adjustably mounted on the carriage and in guiding contact with the face of the drum.

7. A device for grinding the blade on a dryer drum, comprising a track, a wheeled carriage mounted to travel thereon, a driven grinding unit mounted on the carriage, means for vertically adjusting said unit on said carriage, and means for rotatably adjusting said unit with relation thereto, and a straight edge interposed between the drum and blade for spacing the cutting edge of the scraper blade from the face of the dryer drum.

8. A device for grinding the blade on a dryer drum comprising a support, a track mounted thereon, a carriage adapted to travel on said track, and a driven grinding unit mounted thereon, and including a depending bracket said grinding unit being pivotally and vertically adjustable with relation to the bracket, and anti-friction means adjustably mounted on the brackets and engageable with the dryer drum to insure a grind parallel to said drum.

9. A device for grinding the blade on a dryer drum comprising a support, a track adjustably mounted thereon, a carriage mounted to travel on said track, a grinding unit adjustably mounted on said carriage, an adjustable, wheeled means mounted on said carriage and engaging the face of the drum for guiding contact therewith, means for limiting the travel of the carriage, and resilient means on said carriage and engageable with the limiting means for cushioning the shock and reversing the direction of travel of the carriage.

10. A device for grinding the blade on a dryer drum comprising a track, a carriage mounted for travel thereon, a grinding unit vertically and angularly adjustable on said carriage for grinding contact with the blade, and including a cup shaped grinding wheel, means for spacing said blade from the face of the dryer drum, and stops for limiting the longitudinal movement of said carriage.

11. A device for grinding the blades on a dryer drum comprising a track, a carriage mounted to travel thereon and formed with a depending leg, a grinding unit secured on said leg, said unit being vertically and angularly adjustable with relation thereto, a grinding member forming a part of said unit and disposed in grinding relation to the blade, means for spacing the blade from the drum, and manually adjustable means mounted on said leg and engageable with the face of the drum for maintaining the parallel relation of the grinding element with the blade as the carriage travels on the track.

FREDERIC K. BENEDICT.